Figure 1:
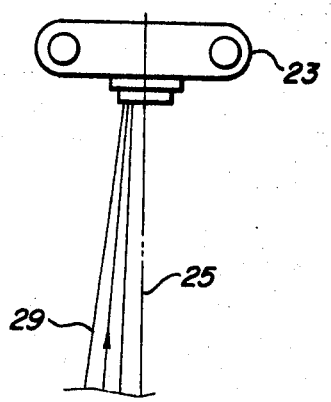

United States Patent [19]
O'Brien

[11] 3,712,729
[45] Jan. 23, 1973

[54] DOCUMENT REPRODUCTION APPARATUS

[75] Inventor: John A. O'Brien, Reading, Mass.
[73] Assignee: Itek Corporation, Lexington, Mass.
[22] Filed: Aug. 6, 1971
[21] Appl. No.: 169,713

[52] U.S. Cl. ....................355/25, 355/65, 355/82
[51] Int. Cl. ....................G03b 27/32, G03b 27/52
[58] Field of Search....................355/23–25, 75, 355/82, 65, 66, 132

[56] References Cited

UNITED STATES PATENTS 3,635,557   1/1972   Alderton ...................355/25 X

FOREIGN PATENTS OR APPLICATIONS 52,824   8/1945   France ...................355/25
898,917   5/1945   France ...................355/25

Primary Examiner—Samuel S. Matthews
Assistant Examiner—Richard A. Wintercorn
Attorney—Homer O. Blair et al.

[57] ABSTRACT

Apparatus is disclosed for simultaneously receiving images contained on facing pages of a document, the apparatus has an optical element with a first and a second flat surface joined together at one edge of each surface, one of the surfaces parallel to one of the facing pages and the other of the surfaces parallel to another of the pages, and, image receiving system remote from the element with an optical axis parallel to a line bisecting the surfaces.

7 Claims, 2 Drawing Figures

PATENTED JAN 23 1973　　　　　　　　　　　　　　3,712,729

DOCUMENT REPRODUCTION APPARATUS

CHARACTERIZATION OF INVENTION

The invention is characterized in apparatus for simultaneously receiving and reproducing images contained on the facing pages of a document comprising an optical element having at least a first and a second flat surface joined together at one edge of each of said surfaces, one of said surfaces placed parallel to one of the facing pages and the other of said surfaces placed parallel to another of said facing pages, and images receiving means remote from said element having an optical axis parallel to a line bisecting said element at the point of joinder of the surfaces.

FIELD OF INVENTION

This invention relates to apparatus for simultaneously reproducing the content of facing pages of a document and more particularly to apparatus for microfilming rare documents without causing injury thereto.

BACKGROUND OF INVENTION

An extensive program of microfilming printed documents is underway to meet the need to efficiently store, distribute and otherwise make available to the public reproductions of the ever increasing volume of printed material. When photographing rare, costly, or aged documents, it is often inadvisable to lay them flat and photograph each of the facing pages simultaneously. Such action may destroy the value of a document by breaking the binding or ripping pages. Current practice, therefore, is to photograph each page individually, never fully opening the document. Since each page is photographed independently, this becomes a time-consuming and extensive procedure. Further, each additional time the volume is handled, it is more subject to damage of the binding or ripping of the pages.

SUMMARY OF INVENTION

It is an object of this invention to provide apparatus for the simultaneous reproduction of facing pages of a document without risking damage to the document.

It is a further object of this invention to provide such apparatus which is inexpensive to purchase, operate and maintain. Thus it is desirable to have available such apparatus which facilitates rapid reproduction and minimizes damage to the document.

This invention features an optical element having at least two flat surfaces joined at one edge of each surface which flat surfaces may be placed parallel to or in contact with the facing pages of a document and an image receiving means remote from the element having an optical axis parallel to a line bisecting the element.

DISCLOSURE OF PREFERRED EMBODIMENTS

Figure 2:
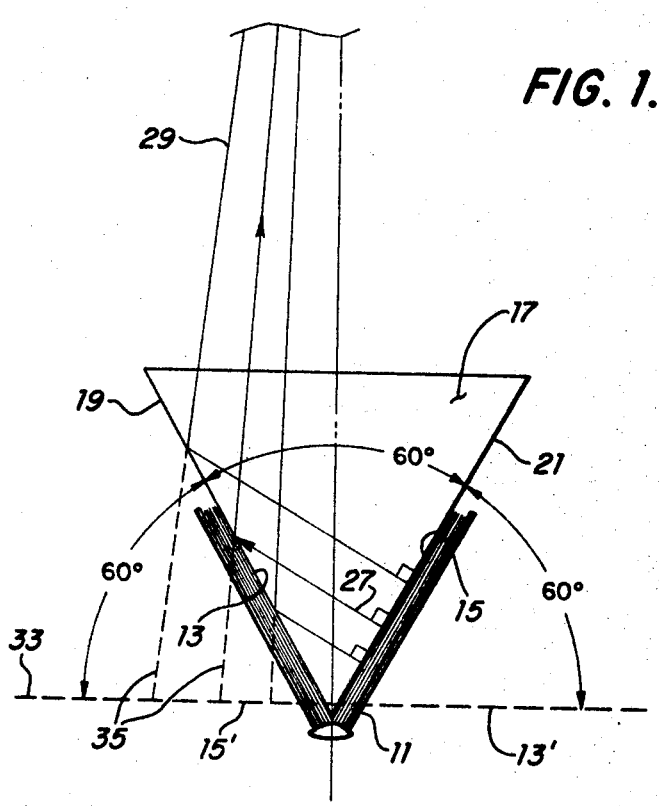
Figure 2:
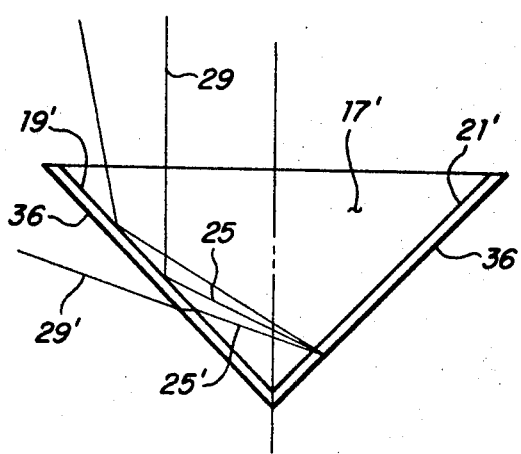

Other objects, features and advantages will occur from the following description of preferred embodiments and the accompanying drawings, in which FIG. 1 is an end view of one embodiment of the invention showing a prism, book and camera; and, FIG. 2 is an end view of a prism having coated or clad faces, which prism may be used in the practice of the invention.

A document, Volume 11, FIG. 1, is placed in an appropriate holder, not shown, such that facing pages 13 and 15, desired to be reproduced, are opened defining an angle therebetween less than 180° thereby eliminating the need to fully open the volume and damage the binding. An optical element, prism 17, made of a light transmissive material such as glass and with first and second surfaces, 19 and 21, is placed so that the surfaces 19 and 21 are parallel to or, as shown, in direct contact with pages 13 and 15, respectively. An image receiving means, camera 23, is situated remotely from the prism 17, such that the optical axis 25 of the image receiving means 23 bisects the prism at the common edge or point of joinder of faces 19 and 21. Image receiving means may well be a television camera or any suitable reproduction or viewing device.

Rays of light energy, represented by lines 27, entering at surface 21, from page 15 pass through the prism to the boundary between surface 19 and page 13 and are reflected therefrom by total internal reflection, as rays 29, and through the lens system of camera 23 to the film plane. Similarly, light rays from page 13, not shown, pass through the prism from surface 19, and are reflected by the boundary between surface 21 and page 15 to the camera 23.

If the prism is equiangular, as shown in FIG. 1, those rays 27, representative of the plane wave emanating from page 15, enter the prism 17 at surface 21 nearly perpendicular thereto, strike surface 19 at an angle of incidence of 30°, hence, are reflected from surface 19 at an angle of 30° and are nearly parallel to the optical axis 25 of camera 23. The apparent image 13' and 15' of pages 13 and 15, is shown by dotted line 33 and the facing pages appear to be flat as if the volume 11 were laid completely opened. The apparent image 33, is generated by extension of lines 29, namely dotted lines 35. Thus, the image at the film in camera 23 is the mirror image of what one would see if the volume were completely opened. If it is desired to produce transparencies, the upper surface of the developed film shows the image correctly oriented. This arrangement has the definite advantage that emulsion to emulsion contact right-reading copies can be made from this negative transparency without the resolution loss usually obtained when printing through the film base.

Practice of the invention is not limited to utilizing an equiangular prism, although only the 60° prism will permit the book to appear to be opened flat.

By providing a coating or cladding 36 on the faces 19' and 21', FIG. 2, of a prism 17', any uncertainty as to the total internal reflection of the image is eliminated. Rather than being dependent upon the surfaces between the faces 19 and 21, FIG. 1, and pages 13 and 15 to dictate the critical angle for refraction and reflection of light rays emanating from the pages; the critical surface is that between faces 19', 21', and the coating or cladding 36. By carefully selecting the indices of refraction of the material of the prism 17' and the coating or cladding 36, in accordance with Snell's law, the critical angle becomes absolute and predictable. Light rays 25 will be reflected from the common surface 19' and 36 (e.g. rays 29) while rays 25' which strike the common surface will be refracted (e.g. rays 29'). Thus the system is independent upon foreign particles which may be found on the surfaces 19 and 21, or on pages 13 and 15. A further coating or cladding may include an anti-reflective coating to enhance the entry of ray energy from pages 13 and 15 to the prism 17'. The coating or cladding 36 may include a thin air space to provide high internal reflectance and hence high efficiency.

To further insure separation of the images from pages 13 and 15 each of the surfaces 19'' and 21'' may be of material having differing light filtering characteristics.

Other embodiments will occur to those skilled in the art and are within the following claims:

What is claimed is:

1. Apparatus for simultaneously receiving images contained on first and second facing pages of a document comprising:
   a. optical means for defining first and second substantially flat surfaces, said optical means including means for positioning said first surface substantially parallel to said first facing page, for positioning said second surface substantially parallel to said second facing page, and for maintaining said first and second surfaces oriented relative to each other to cause the images on said first page to pass through said first surface and be reflected from said second surface and to cause the images on said second page to pass through said second surface and be reflected from said first surface; and
   b. image receiving means for simultaneously receiving the reflected images of said first and second pages.

2. The apparatus of claim 1 wherein said optical means comprises a prism.

3. The apparatus of claim 2 wherein said prism is equiangular.

4. The apparatus of claim 1 wherein said first and second surfaces are in contact with said first and second facing pages, respectively.

5. The apparatus of claim 1 wherein the image receiving means includes a photo sensitive medium.

6. The apparatus of claim 5 wherein the image receiving means comprises a camera.

7. Apparatus as recited in claim 6 wherein said optical means comprises a prism and wherein the optical axis of said camera extends through a common edge joining said first and second surfaces of said prism.

* * * * *